June 10, 1930.   R. NUTTALL   1,763,535
ELEVATING HAND TRUCK
Filed Sept. 18, 1923
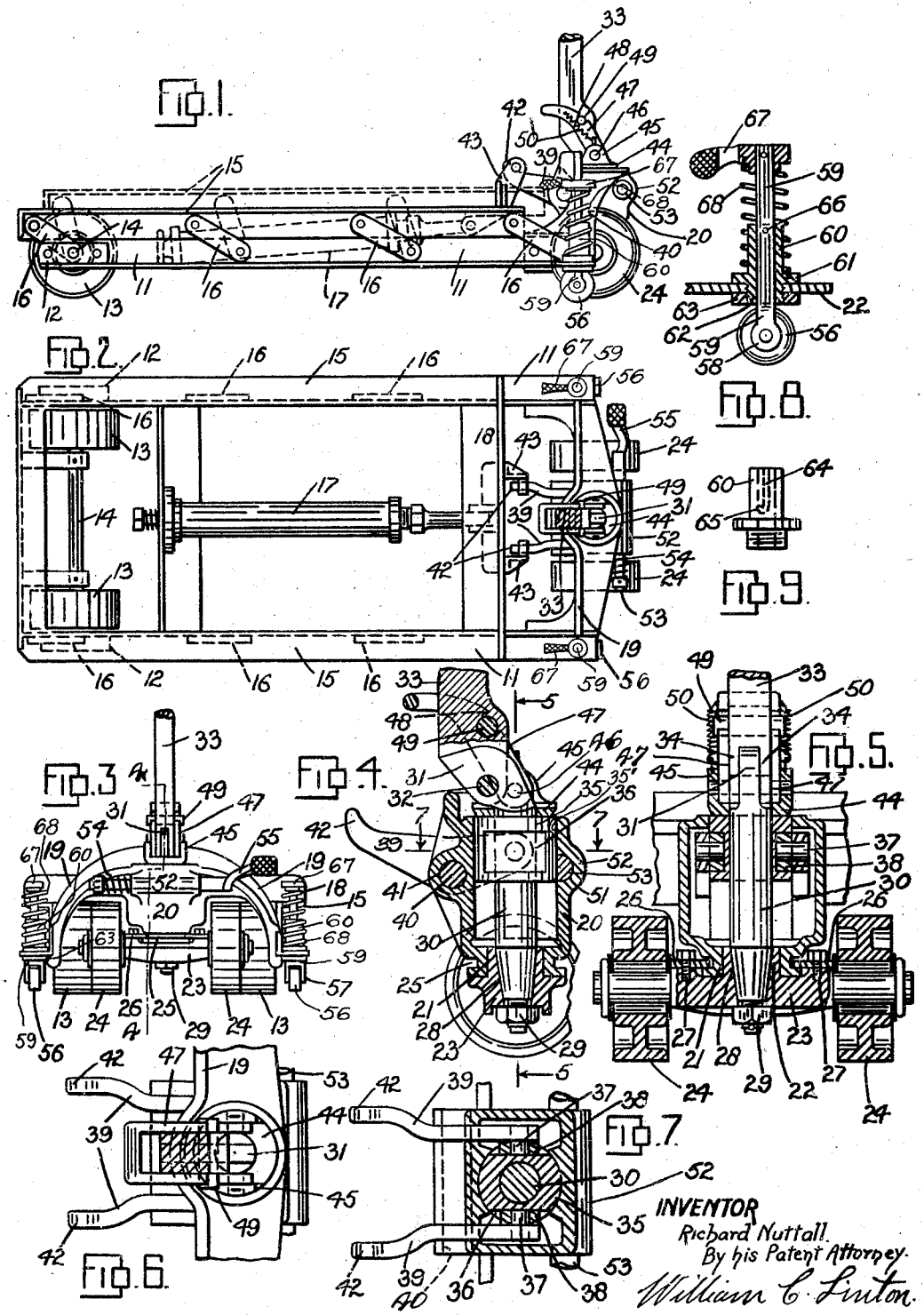
INVENTOR
Richard Nuttall.
By his Patent Attorney
William C. Linton.

Patented June 10, 1930

1,763,535

UNITED STATES PATENT OFFICE

RICHARD NUTTALL, OF WAVERLEY, NEAR SYDNEY, NEW SOUTH WALES, AUSTRALIA

ELEVATING HAND TRUCK

Application filed September 18, 1923, Serial No. 663,434, and in Australia October 22, 1922.

This invention relates to elevating hand trucks in which the load carrying platform is elevatable and lowerable by drawing it forward and allowing it to retire upon links and which trucks are specially serviceable in warehouses and the like for the purposes of picking up, transportating and setting down loads of stacked material and goods, and the improvements have been specially devised in order to provide improved means whereby the steering and elevating handle or lever may be operated at any radial position, will not be kicked up or raised when the platform is descending either when intentionally released or accidentally by the locking mechanism slipping or failing or the braking mechanism failing to check the descent of the loaded platform, and is free for steering the truck in any position without interfering with the elevating and locking mechanism; and an automatic locking and operable releasing device for retaining the platform in elevated position until said device is operated to release it.
In order that the improvements and a practical application thereof will be readily understood the same may now be described with reference to the accompanying drawings in which:—
Figure 1 is a side elevation of a truck with the improvements incorporated,
Figure 2 is a plan of the same,
Figure 3 is a front elevation of the same,
Figure 4 is a vertical sectional elevation on the line 4—4 in Figure 3,
Figure 5 is a vertical sectional elevation on the line 5—5 in Figure 4,
Figure 6 is a partial plan of Figure 4,
Figure 7 is a sectional plan on the line 7—7 in Figure 4,
Figure 8 is a sectional elevation of a depressible and releasable stabilizing wheel, and
Figure 9 is a vertical sectional elevation of the bearing for the post of such wheel.
Having more particular reference to the drawings wherein like characters of reference will designate corresponding parts throughout, my improved device may be stated to comprise a frame consisting of side members 11 and carrying at its rear end the bearings 12 adapted to receive the axle 14 of the wheels 13. Upon said frame, is a load platform 15 connected to the side members 11 by means of links 16. Between the side members 11, is disposed a cushioning and bracing dash pot 17 with its plunger attached to the forward end 18 of said platform 16.

A fore carriage head or bolster having declined arms 19 is positioned between and secured to the forward ends of the side members 11 and has a central depending vertically disposed box 20 having in its lower end a bore 21 to receive the circular and upstanding boss 22 of the axle 23 whereon are secured the front wheels 24 and has externally an annular groove 25 for retaining plates 26 bolted to the top of the axle 23 by screw bolts 27. The axle 23 and the boss 22 thereof have a tapered bore 28 in which is secured by nut 29 the lower and tapered end of a steering post 30 which has at its upper end an angled and transversely orificed tongue 31 and upon and to same is hingedly connected by a pin 32 the end of lever 33 which is bifurcated or slotted to form jaws 34 which are transversely orificed for reception of said pin 32. Upon the steering post 30 within the box 20 and vertically slidable in the upper bore thereof which is formed vertically of said box, is a collar 35 with oppositely positioned side slots 36 for the reception of slide blocks 38 in which engage the inwardly disposed trunnions 37 on the inner or forward ends of elevating levers 39 which pass through an opening in the rear of the box 20 and are fulcrumed upon a shaft 40 in external lugs 41 on said box 20. The exposed or rear ends of said levers 39 are hooked as at 42 to engage the upstanding lugs or hooks 43 upon the forward end of the elevatable platform 15. Riding upon said collar 35 is an annular plunger 44 having oppositely positioned upstanding lugs 45 which are transversely orificed. To said lugs are connected by a common pin 46 the lower ends of links 47 which have their free ends rearwardly curved and preferably connected by a bar bolted therebetween and in their forward edge a slot 48 for reception of the transversely projecting ends of an engaging bar 49 through the lever 33. Each link 47 has connected adjacent its outer or free end, a coil spring 50 and the opposite ends of these coil springs are connected to the projections formed with the lugs 45. These springs being arranged above the fulcrum points of the links 47 cause the latter to normally be retained in a vertical position. When the lever 33 is raised to a position as shown in Figures 1 and 4, the bar 49 carried thereby will be seated within the slots or recesses 48 of the links 47 whereby, with the assistance of the tension caused by the springs 50, the links 47 will be locked to the lever 33 the tension of the springs 50 being sufficient to perform this function. When the links 47 are in locking engagement with the lever 33, the load platform may be elevated by swinging the lever 33 forward whereat the links and the annular plunger 44 will be forced downwardly carrying the collar 35 therewith. As the collar descends, the levers 39 will be caused to move about their pivot connections whereby the hooks 42 engage the lugs 43 and cause the platform 15 to move therewith, or to the latter's elevated position. When the collar 35 is fully depressed, the bar 53 will retain the same in this latter position, but in order that the lever 33 may be used for hauling or steering purposes, it must be first raised and the links disengaged from the bar 48 by manually pressing down upon the free ends of the links, whereat the lever 33 is released from locking engagement with the collar 35. Across the upper bore of said box 20 and in an internal recess 51 of an external and longitudinally bored enlargement 52 of the box 20 is the locking bar 53 with medial portion segment shaped in cross section and each end projecting through each bored end of said enlargement 52. One end of the bar 53 carries a spring 54 to normally turn said bar against the collar 35 so that upon complete depression of said collar the bar 53 will project in the path of travel of said collar and lock same against rising. The other end of the bar 53 carries a radial foot lever 55 by which the bar 53 is turned back clear of the collar 35 when it is desired to release same to allow the platform to descend.

When desired a stabilizing or supporting wheel 56 is mounted beneath each forward end of the truck frame to prevent over-balancing thereof as may occur when the operating and steering lever 33 is manipulated at an angle to the truck. Such stabilizing wheel may be mounted upon a fixed axle in a pair of depending lugs or brackets 57 secured to the longitudinals 21. In the preferred embodiment of the invention, the stabilizing wheels 56 are carried upon an axle extending between the jaws 58 of the lower end of a post 59 received in a vertical bearing 60 provided with a flange 61 adapted to rest upon the side members 11 and having a screw threaded end 62 designed to pass through said side members and receive the retaining nuts 63. The bearing 60 is provided with a vertical slot 64 having an angled end 65 and engaging a pin 66 fixed on said post 59. A foot crank 67 upon the upper end of said post 59 and connected to the end of a torsion spring 68 around the post 59 and bearing 60 serves to operate the said post when the wheel 56 is to be depressed and later released.

In use, to elevate the platform 15, the lever 33 is elevated until the bar 49 therethrough enters the slots 48 of the links 47, when the lever 33 is pulled forwardly downwardly thus depressing the plunger 44, collar 35 and the forward ends of levers 39 whose rear ends 42 are thus forwardly raised and pull the platform 15 forwardly and upwardly upon the links 16, the descent of lever 33 being continued until the collar 35 passes the locking bar 53 which enters a recess 35' in said collar and locks same in lower and the platform 15 in upper positions. The lever 33, post 30 and axle 23 are then free to be revolved in desired directions for manipulation and transport of the truck. To release the platform 15 to descend, the lever 55 on locking bar 53 is depressed thus clearing said bar from the collar 35 which is then free to be drawn up by the forward ends of the levers 39 as their rear ends are pulled down by the descending platform 15 which, as usual, is checked or braked in its descent by the dashpot 17. When the depressible stabilizing wheels are used and it is desired to prevent the truck being overturned each wheel 56 is depressed against the floor or other supporting surface by pressing a foot upon the crank 67 the torsion of spring 68 turning the post 59 so that the pin 66 thereon will enter the angled extension 65 of the slot 64 and hold the post 59 and the wheel 56 down until the post is released by slightly pressing the crank 67 and turning it in opposite direction.

I claim:—

1. An elevating hand truck comprising an elevating platform having lugs carried thereby, a fore-carriage head adapted to be connected to the truck, a vertically disposed box provided therewith, an axle revolvably mounted in the base thereof and carrying supporting wheels, a post secured to said axle and extending up through said box, a steering lever hinged to the head of said post, elevating levers medially fulcrumed to said box with their rear ends adapted to engage the lugs of the platform of the truck and their forward ends projecting within said head, a vertically slidable collar on said post and engageable with the forward ends of said elevating levers, and means engageable by said steering lever for downwardly thrusting said collar by depression of said lever, and disengageable from said lever to permit independent ascent of said means and collar.

2. In an elevating hand truck, the combination with the parts set out in claim 1 of a spring operable locking bar to automatically engage and lock the vertically slidable collar in descended position and to be released therefrom by pressure upon said bar.

3. An elevating hand truck comprising in combination, steering wheels, a steering lever operatively connected to said wheels, a vertically slidable collar, elevating levers operatively connecting said collar with the platform of the truck, and a vertically slidable plunger riding upon said collar and carrying links adapted to be engaged by said steering lever to thrust said collar downwardly.

4. In and for elevating hand trucks, front supporting and steering mechanism consisting of a fore-carriage head or bolster adapted to be connected to the truck frame and having a vertically disposed box, an axle adapted to have traction wheels secured thereon and having a boss to enter a bore in the lower end of the box, a post secured in said axle and upstanding through the box and having an operable lever hinged to its upper end, a vertically slidable collar about said post and in the upper bore of the box and having oppositely disposed side recesses, levers fulcrumed upon said box with their forward ends in engagement with said side recesses and their rear ends adapted to engage the forward end of the elevatable platform, an annular plunger riding upon said collar and having upstanding lugs, links connected to said lugs and having their free ends adapted to be engaged by the operable lever, and a spring controlled operable locking bar across the upper bore of said box all for the purposes set forth.

5. In and for elevating hand trucks, the combination and arrangement with the parts set forth in claim 4 the box having an external annular recess upon the lower end thereof and retaining plates in engagement with said recess and secured to the top of the wheel axle for the purpose set forth.

6. A hand truck comprising in combination, an elevating platform having lugs carried thereby, steering wheels and a steering post therefor, a manually operable lever hinged to the top of said post, medially fulcrumed levers each having one end engageable with the lugs of said platform, a collar slidable upon said post, means for operatively connecting the opposite ends of said levers to the collar, and a plunger riding the collar and carrying spring supported links cooperable with the manually operable lever whereby the same may be, at times employed for raising said platform.

Dated this seventeenth day of August, one thousand nine hundred and twenty-three.

RICHARD NUTTALL.